United States Patent
Gilbert et al.

Patent Number: 5,432,640
Date of Patent: Jul. 11, 1995

[54] SPIGOT TYPE BREAK-AWAY MIRROR

[75] Inventors: Robert W. Gilbert, Lonsdale, Australia; Neil J. Francis, Grosse Pointe Park, Mich.

[73] Assignee: Britax Rainsfords Pty Ltd., Australia

[21] Appl. No.: 946,807

[22] Filed: Sep. 17, 1992

Related U.S. Application Data

[63] Continuation of Ser. No. 707,169, May 30, 1991, abandoned.

[30] Foreign Application Priority Data

Jun. 4, 1990 [AU] Australia ............... PK0432

[51] Int. Cl.⁶ ............... B02B 7/18; G60R 1/06
[52] U.S. Cl. .................. 359/841; 359/872; 248/549; 248/478; 248/900
[58] Field of Search ........... 350/604, 632, 633, 634, 350/636, 637; 248/477, 478, 480, 900, 549; 359/841, 872, 876

[56] References Cited

U.S. PATENT DOCUMENTS

| | | |
|---|---|---|
| 4,477,199 | 10/1984 | Manzoni . |
| 4,626,083 | 12/1986 | Nakayama et al. .......... 350/604 |
| 4,626,084 | 12/1986 | Kumai .................. 350/604 |
| 4,981,349 | 1/1991 | Tamiya et al. ............ 350/637 |
| 5,005,797 | 4/1991 | Maekawa et al. .......... 248/900 |

FOREIGN PATENT DOCUMENTS

| | | |
|---|---|---|
| 0173113 | 8/1985 | European Pat. Off. . |
| 0402465 | 1/1989 | European Pat. Off. . |
| 2499483 | 8/1982 | France . |
| 2502080 | 9/1982 | France . |
| 1814545 | 9/1970 | Germany ............ 248/900 |
| 59-195447 | 11/1984 | Japan . |
| 59-195449 | 11/1984 | Japan . |
| 0113744 | 6/1985 | Japan ............. 350/604 |
| 0148737 | 8/1985 | Japan ............. 350/637 |
| 0082844 | 4/1988 | Japan ............. 359/877 |
| 0173745 | 7/1988 | Japan ............. 350/637 |
| 0032940 | 2/1989 | Japan ............. 359/841 |
| 0237235 | 9/1989 | Japan ............. 350/637 |
| 2041857 | 9/1980 | United Kingdom ...... 248/478 |
| 1600425 | 10/1981 | United Kingdom . |
| 2222562 | 3/1990 | United Kingdom . |
| WO89/00518 | 1/1989 | WIPO . |

Primary Examiner—Ricky D. Shafer
Attorney, Agent, or Firm—Harness, Dickey & Pierce

[57] ABSTRACT

A spigot type breakaway mirror (10) for automobile exterior use includes both a supporting base (11) and a mirror subassembly (16), the base (11) having an upstanding spigot (12) which has a curved constraining surface (13), and the mirror subassembly (11) is provided with a locating surface (17) engageable over constraining surface (13) which constrains pivotal movement of the mirror subassembly to be about the spigot, but there are provided a cam pad (23) and recess surface (24) on the base and mirror subassembly respectively, and a spring (20) which cooperates between the base and mirror subassembly to retain the cam and recess surfaces in engagement, but the cam pad (23) and recess (24) surfaces cause the mirror subassembly (16) to cam outwardly away from the supporting base (11) if the mirror subassembly is caused to deflect upon striking an obstruction.

14 Claims, 3 Drawing Sheets

SPIGOT TYPE BREAK-AWAY MIRROR

This is a continuation of U.S. patent application Ser. No. 07/707.169, filed May 30, 1991 now abandoned.

This invention relates to a spigot type breakaway mirror for automobile exterior use.

BACKGROUND OF THE INVENTION

A breakaway mirror according to prior art usually has a base and a mirror subassembly which is coupled to the base to be movable with respect to the base upon encountering an obstruction, this being a very important safety feature. The movement may be in a rearward direction if the vehicle is travelling forwardly or in a forward direction if it is travelling rearwardly.

There is a requirement for exterior accessories on automobiles to be aesthetically acceptable, and this usually requires a very smooth outer face of the mirror assembly including both the visible part of the support bracket and the housing portion of the mirror subassembly which is pivoted with respect thereto. If pivot means is required to operate in one direction only, the matter is simple and it is easily arranged for the outer face to be moved away from the supporting base so that any damage to the outer face will not include damage inflicted thereon by scraping over the supporting bracket. However, difficulties are encountered if the mirror is required to breakaway in either a forward or rearward direction, and the most usual construction is similar to that illustrated in our Australian Patent 597819 (15542/88), wherein the mounting bracket is provided with outstanding spigots having curved surfaces thereon and the spigots engage recesses in the mirror subassembly, the mirror subassembly being retained to the spigots by means of a spring, and the spigots being spaced in a fore and aft direction from one another so that upon rearward deflection of the mirror upon striking an obstruction the pivotal movement takes place around the two rearward spigots, and vice versa for forward direction of breakaway. Although such a system will reduce face damage to areas close to the spigots, nevertheless some face damage does occur.

It is also known to utilise spigot type mountings for mirrors wherein a metal die cast base is used for a mounting bracket, and includes an upstanding spigot with a circular bearing surface, and a moulded plastics subassembly rotates about that bearing surface upon deformation of resilient portions of the plastics material which resiliently engage surfaces on the level base. Again a difficulty is encountered in providing sufficient clearance between the mounting base and the polished face of the mirror subassembly to avoid damage, it of course being necessary for both appearance and avoidance of wind noise that the clearance between those two portions should be small.

BRIEF SUMMARY OF THE INVENTION

In this invention a spigot type breakaway mirror for automobile exterior use includes both a supporting base and a mirror subassembly, the base having an upstanding spigot which has a curved constraining surface, and the mirror subassembly is provided with a locating surface engageable over the constraining surface which constrains pivotal movement of the mirror subassembly to be about a pivotal axis of the spigot, but there are provided cam and recess surfaces on the base and mirror subassembly and a spring which cooperates between the base and mirror subassembly to retain the cam and recess surfaces in engagement, but the cam and recess surfaces cause the mirror subassembly to cam outwardly away from the supporting base if the mirror subassembly is caused to deflect upon striking an obstruction. In this way the clearance between the mirror subassembly and the base is increased upon the first stages of pivotal movement about the spigot so that the face of the mirror subassembly is clear of the base under normal breakaway conditions.

More specifically, a spigot type mirror for automobile exterior use according to this invention comprises a supporting base having an upstanding spigot thereon, the spigot having a curved constraining surface extending for at least some if its length, a mirror subassembly having a locating surface engageable with the spigot constraining surface thereby constraining pivotal movement of the mirror subassembly to be about a pivotal axis of the spigot, cam and recess surfaces on the base and mirror subassembly and spring means co-acting therebetween to retain the cam and recess surfaces in engagement, but upon said pivotal movement occurring, relative movement of said cam and recess surfaces effect movement against pressure exerted by the spring means, of the locating surface over the spigot and of the mirror subassembly outwardly away from the base.

BRIEF DESCRIPTION OF THE DRAWINGS

An embodiment of the invention is described hereunder in some detail and is illustrated in the accompanying drawings in which.

DETAILED DESCRIPTION OF THE DRAWINGS

Figure 3:
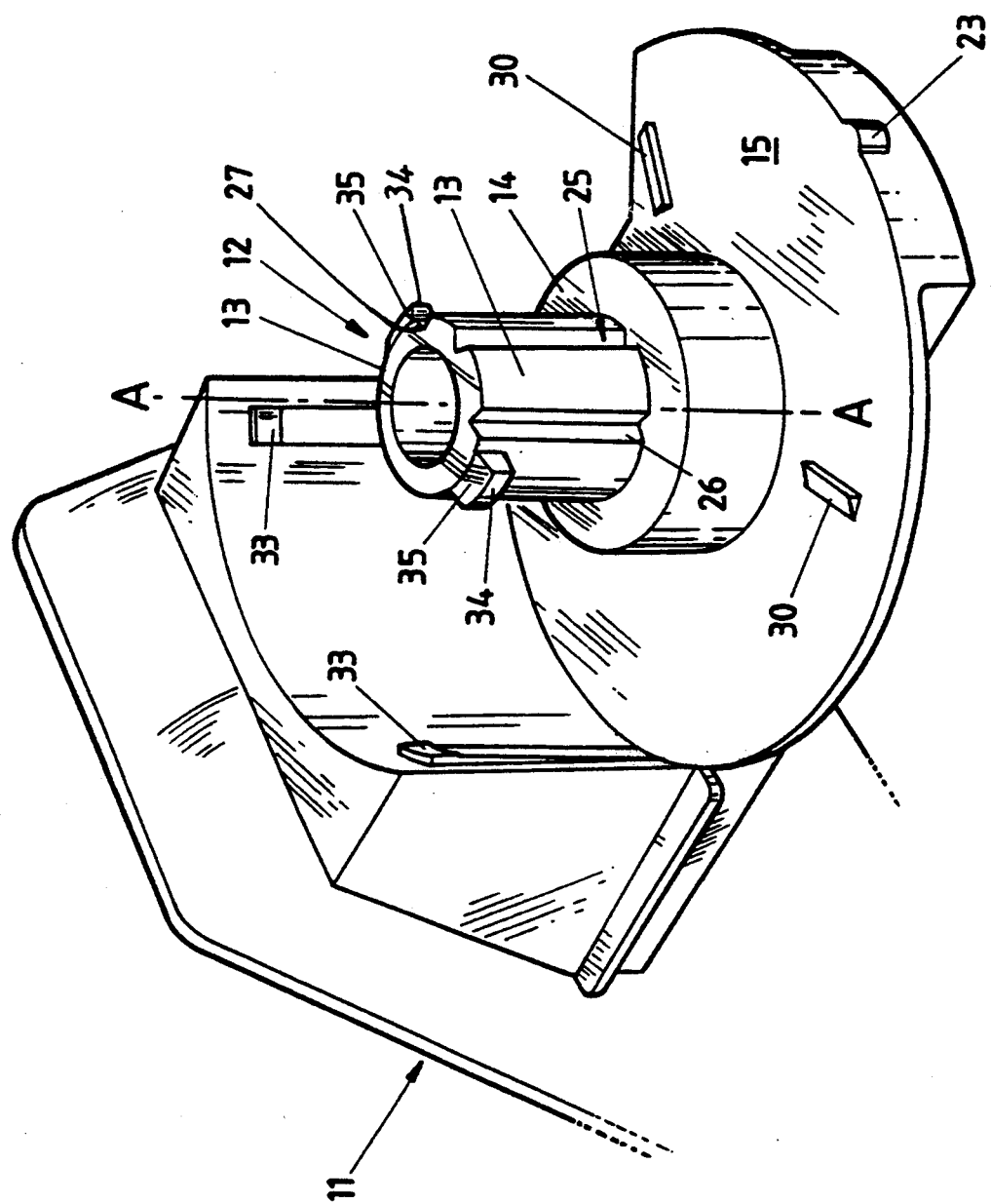
FIG. 3 is a fragmentary perspective view of the base showing the upstanding spigot.

In this embodiment a spigot type breakaway mirror 10 is an assembly which comprises a base 11 (shown in perspective in FIG. 3), the base 11 being provided with fastening means (not shown) for fastening to the exterior of a vehicle. The base 11 has an upstanding spigot 12 which has a cylindrically curved surface 13 surrounding a pivotal axis 'A' extending for some of its length. The curved surface 13 functions more as a constraining surface than as a bearing surface, as described below. The spigot 12 is reinforced at its lower end by a boss 14 carried on a support platform 15 of the base A mirror subassembly 16 has a locating surface 17 which defines an elongate aperture surrounding spigot 12 so that the mirror subassembly 16 is pivotable generally about the spigot axis 'A'. The mirror subassembly also has a housing 18 which houses a spring box 19, the spring box 19 containing a spring 20 which bears at one end against the end wall of spring box 19 and at the other end against a pressure pad 21, the pressure pad 21 pressing against portion of the curved surface 13 of the spigot 12. This urges the housing 18, and thereby the mirror subassembly 16, in an inboard direction by the distance marked 'D' in FIG. 1

Base 11 is provided with a cam pad 23 projecting from a convexly curved surface of support platform 15. The cam pad 23 engages in a complementary recess 24 in a surface of the mirror subassembly 16, which is circularly curved about axis 'A'. It also lies in a plane Pr, which is a radial plane of the axis 'A' of spigot 12 (and vertical as drawn in FIGS. 1 and 2).

In the curved surface of spigot 12 there is a central recess 25 and two peripheral recesses 26 and 27, recess 26 spaced from central recess 25 in a clockwise direction and recess 27 in a counter-clockwise direction. The drawings show the mirror subassembly 16 in its normal outboard position and in that position, the central recess 25 receives a projection 28 which extends radially inwardly from locating surface 17. Pivotal breakaway movement can only occur when the mirror subassembly 16 moves out of central recess 25 by the distance 'D', compressing spring 20 upon pivotal breakaway movement, so that the projection 28 can traverse the curved surface This movement is provided by cam pad 23, but is limited by abutment of a central rib 29 after about 60° of movement, against one or other of ribs 30 upstanding from support platform 15. In either one of those positions, the projection 28 engages in a respective one of recesses 26 or 27, and retains the mirror "park" position until it is reset. The central recess 25 does not necessarily provide a cam action, but provides a space to receive the projection 28 when the mirror is in its outboard "in use" position.

When cam pad 24 is in recess 23, two abutment pads 32 on the mirror subassembly 16 lie in face to face abutment with two abutment pads 33 on base 11 adjacent to a location 37 (where the upper surface of the mirror subassembly 16 meets the upper surface of the base 11). The abutment pads 32 and 33 are in a second horizontal plane P2, the cam pad 23 and recess 24 in a first horizontal plane P1, and the spring 20 in an intermediate horizontal plane Pi mid way between planes P1 and P2. Thus the pressure exerted by the spring provides a stable three point outboard condition for the mirror subassembly 16 when viewed in the front elevation of FIG. 2.

Figure 1:
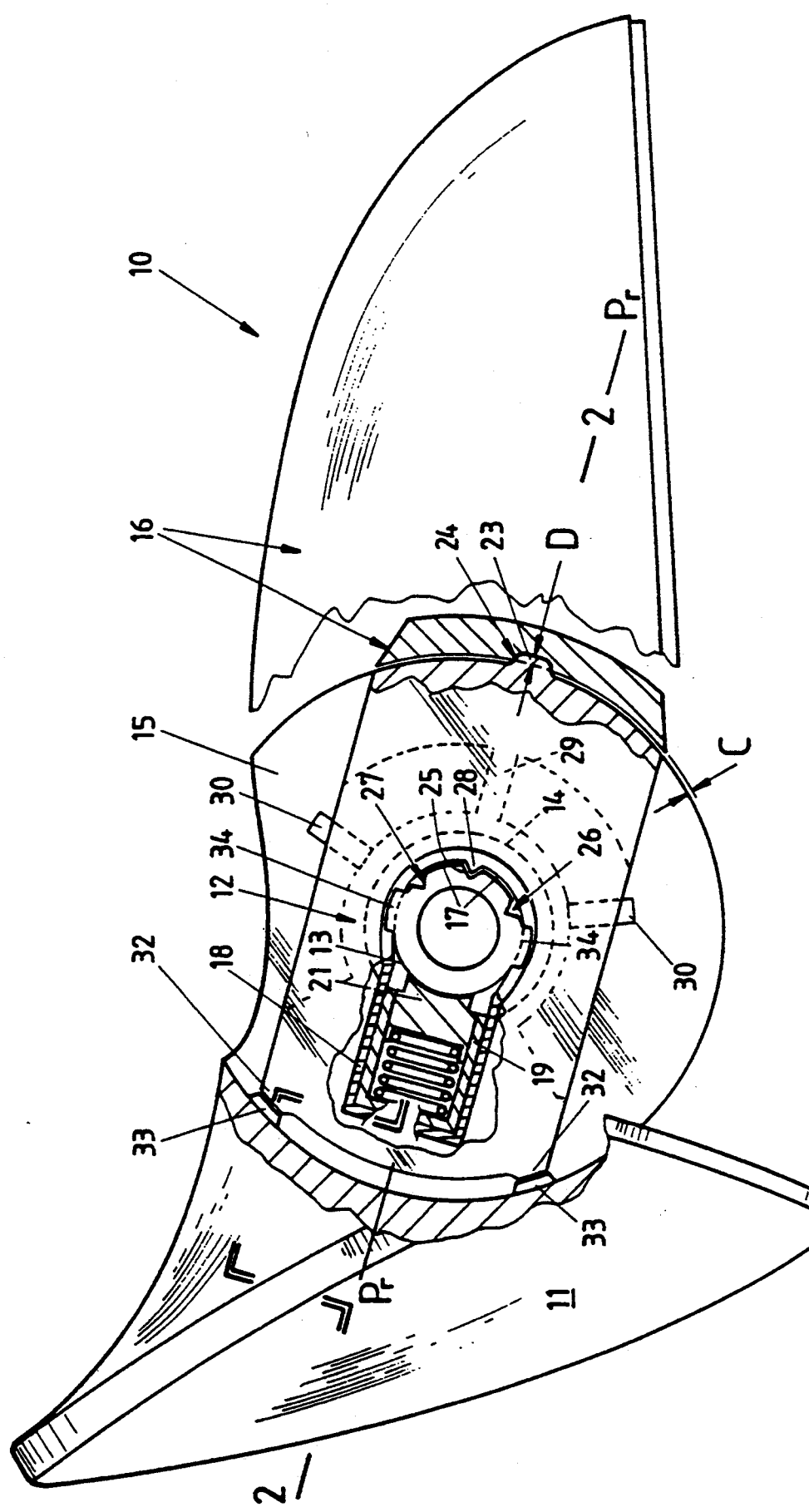
FIG. 1 is a plan view of two orthographic views of a spigot type breakaway mirror showing the base, the mirror subassembly and the breakaway mechanism therefor.
Figure 2:
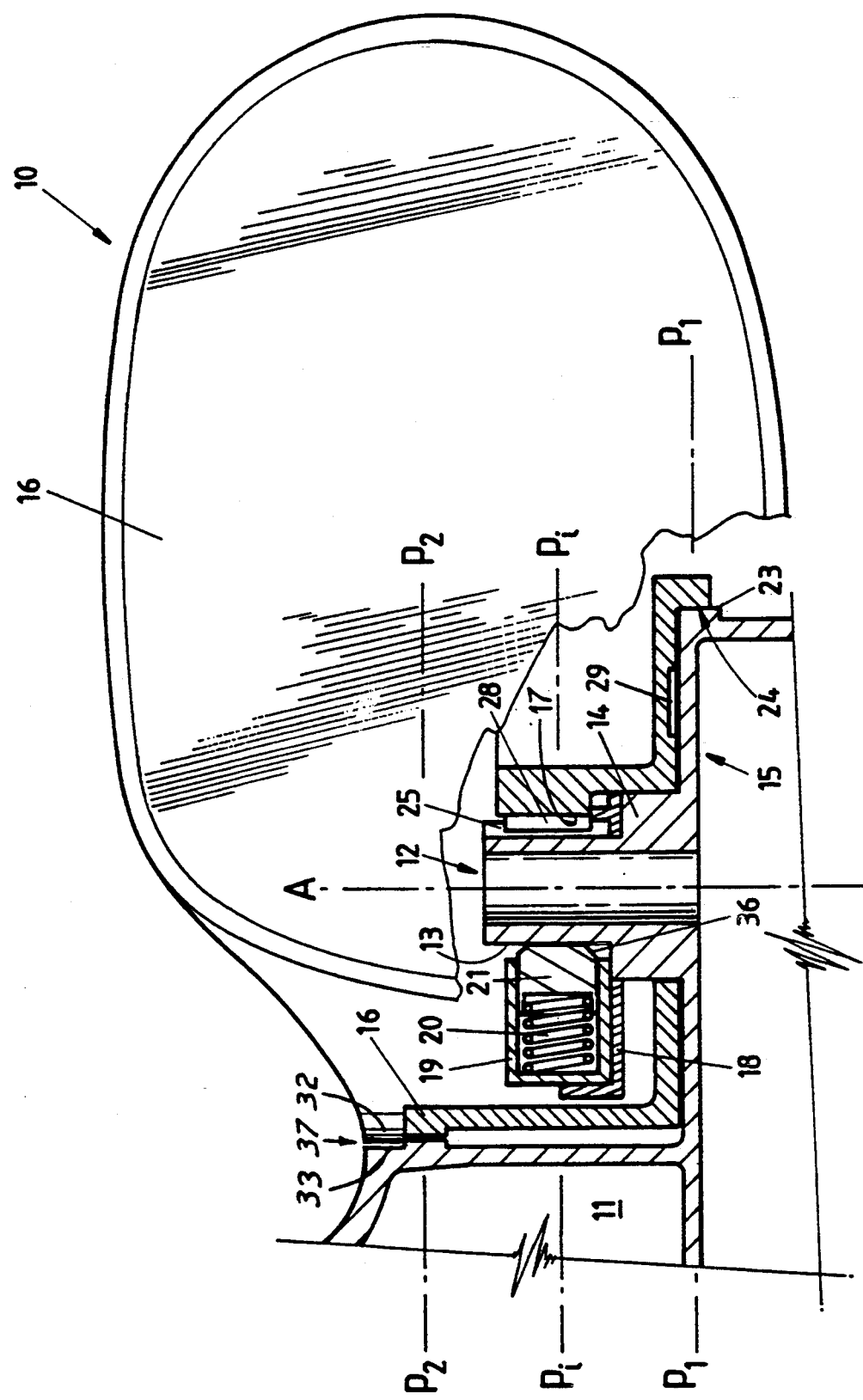
FIG. 2 is a rear elevation of FIG. 1.

The abutment pads 32 and 33 are equally spaced on opposite sides of the radial axis Pr as viewed in FIG. 1, so that the stable condition occurs also in plan. The mirror subassembly is thereby substantially free of vibration when in its outboard position.

The inboard upper edge of the spigot 12 is provided with a pair of opposite retention lips 34, each having a lead in chamfer 35 and the pressure pad 21 is also provided with a chamfer at 36 which rises over the chamfer 35 upon assembly, and this greatly facilitates assembly since the spring box 19 can most conveniently be first assembled to the mirror subassembly 16 and the entire assembly then positioned over the spigot 12 by positioning substantially at right angles to its outboard in-use position, and subsequently rotating to that position, where it is retained by the lips 34. Once in position, the lips 34 on the upper end of spigot 12 will retain the assembly (see FIG. 1), but disassembly is easily effected by rotating the mirror subassembly 16 from its outboard position (past ribs 30), compressing spring 20 and then releasing the spring box from the spigot 12 by an axial movement. In place of the lips 34, a single lip may be provided on the radial Pr plane and assembly effected with the mirror subassembly 16 in its outboard position. Use of two lips 34 (as shown) is preferred because this reduces danger of dislodgement which can conceivably occur if only a single lip is used.

Clearly the locations of the abutment pads and cam pad and recess can be reversed, cam pads and recesses lying in plane P1 and abutment pads in plane P2.

If the distance between the plane P1 and the location 37 (where the upper surface of the mirror subassembly 16 meets the upper surface of the base 11) is smaller than illustrated, planes P1 and P2 will be closer to each other and the boss 14 will be shorter or non-existent.

The claims defining the invention are as follows:

1. A spigot type breakaway mirror for automobile exterior use comprising a base having a mounting portion adapted to abut against a vehicle body and a support platform projecting laterally from the mounting portion, a spigot projecting upwardly from the support platform and having a curved constraining surface extending for at least some of its length.

a mirror subassembly having a locating surface engagable with the spigot constraining surface thereby constraining pivotal movement of the mirror subassembly about a pivot axis of the spigot.

a cam surface comprising a surface of a cam pad which extends in a radially outboard direction from the mounting portion, a recess surface comprising a complementary surface of the mirror subassembly, and two abutment pads located on the mounting portion and circumferentially spaced from one another, said cam and recess surfaces being located to one side of said spigot at a greater distance from the mounting portion than the spigot, and spring means acting between the spigot and mirror subassembly to retain the cam and recess surfaces in engagement, but upon said pivotal movement occuring, relative movement of said cam and recess effecting movement of the locating surface over the spigot and of the mirror subassembly outwardly away from the base against pressure exerted by the spring means.

2. A spigot type breakway mirror according to claim 1, wherein said spigot has a cylindrical surface circularly curved about an axis of said spigot, the generally circular surface containing axially extending surfaces which define three circumferentially spaced recesses, each extending at least part way along the spigot, the mirror subassembly comprising a radially inward projection which selectively enters said recess surfaces.

3. A spigot type breakaway mirror for automobile exterior use comprising a base having a mounting portion adapted to abut against a vehicle body and support platform projecting laterally from the mounting portion, a spigot projecting upwardly from the support platform and having a curved constraining surface extending for at least some of its length, a mirror subassembly having a locating surface engageable with the spigot constraining surface thereby constraining pivotal movement of the mirror subassembly about a pivot axis of the spigot, cam and recess surfaces on the support platform and mirror subassembly located at a greater distance from the mounting portion than the spigot and lying both in a radial plane which contain said spigot axis in a first plane at right angles both to the radical plane and to said spigot axis, abutment pads co-acting between the base and mirror subassembly in a second plane also at right angles to the radial plane and parallel to said first plane, and spring means applying a force in the radial plane between said spigot and mirror subassembly at a location between said first and second planes to retain the cam and recess surfaces in engagement and said co-action of the abutment pads, but upon said pivotal movement occuring, relative movement of said cam and recess surfaces effect movement of the locating surface over the spigot and of the mirror subassembly outwardly away from the base against pressure exerted by the spring means.

4. A spigot type breakway mirror according to claim 3 wherein said spring means comprises a spring box carried by the mirror subassembly, a spring housed in said spring box, and a pressure pad which bears against said spigot constraining surface in an intermediate plane between said first and second plane thereby releasably retaining said cam surface in engagement with said recess surface.

5. A spigot type breakway mirror according to claim 4 wherein an upper end of said spigot has at least one rigid radially extending retaining lip and a chamfer lead-in surface, said chamfer surface facilitating assembly of the mirror subassembly to said spigot, and said lip inhibiting subsequent axial movement of said mirror subassembly relative to said spigot.

6. A spigot type breakaway mirror according to claim 5 wherein said cam surface is a surface of a single cam pad which extends radially outwardly from the base in said radial plane, said abutment pads comprise two pads on the base which are spaced equally on opposite sides of the radial plane, and two pads on the mirror subassembly co-acting therewith, and said spring means comprises a spring carried by the mirror subassembly.

7. A spigot type breakaway mirror for automobile exterior use according to claim 3 wherein the support platform comprises said cam surface and said recess surface is a surface of the mirror subassembly.

8. A spigot type breakaway mirror according to claim 3 wherein said spigot has a cylindrical surface circularly curved about an axis of said spigot, the generally circular surface containing axially extending surfaces which define there circumferentially spaced recesses, each extending at least part way along the spigot, the mirror subassembly comprising a radially inward projection which selectively enters said recess surfaces.

9. A breakaway mirror for automobile exterior use comprising:

a base having a mounting portion adapted to abut against a vehicle body and a support platform projecting laterally from the mounting portion, a spigot upstanding on the support platform and having a curved constraining surface extending for at least some of its length, a mirror subassembly having a locating surface engageable with the spigot constraining surface thereby constraining pivotal movement of the mirror subassembly to be about a pivotal axis of the spigot, cam and recess surfaces on the base and mirror subassembly located to one side of and spaced from said spigot, spring means exerting a force between the spigot and the mirror subassembly in a direction at right angles to the pivot axis of the spigot to retain the cam and recess surfaces in engagement, abutment pads co-acting between the base and mirror subassembly and located on the opposite side of said spigot to the cam and recess surfaces, whereby, upon said pivotal movement occurring, relative movement of said cam and recess surfaces effects movement against said force exerted by the spring means, of the locating surface over the spigot and of the mirror subassembly outwardly away from the mounting portion of the base, the abutment pads being retained in abutment by said spring means when said cam and recess surfaces are in engagement, but moving out of abutment upon said outward movement of the mirror subassembly.

10. A spigot type breakaway mirror for automobile exterior use according to claim 9 wherein the support platform comprises said cam surface and said recess surface is a surface of the mirror subassembly.

11. A spigot type breakaway mirror according to claim 9 wherein said spigot has a cylindrical surface circularly curved about an axis of said spigot, the generally circular surface containing axially extending surfaces which define three circumferentially spaced recesses, each extending at least part way along the spigot, the mirror subassembly comprising a radially inward projection which selectively enters said spaced recesses of the spigot.

12. A spigot type breakaway mirror according to claim 9 wherein said mirror subassembly is moveable in a generally radial direction with respect to said axis of said spigot, said spring means being operative to bias said mirror subassembly in a first generally radial direction with respect to said axis and said cam and recess surfaces being operative to effect generally radial movement of said mirror subassembly in a second movement of said mirror assembly.

13. A spigot type breakaway mirror according to claim 9 wherein said cam and recess surfaces are operative to effect generally radial movement of said mirror subassembly with respect to said axis or said spigot in response to pivotal movement of said mirror subassembly.

14. A spigot type breakaway mirror according to claim 9 wherein said abutment pads comprise two pads on said mirror subassembly and on said base, said abutment pads being radially spaced from said axis of said spigot, axially spaced from said cam and recess surfaces and circumferentially spaced from said cam and recess surfaces, said abutment pads cooperating with said cam and recess surfaces to stabilize said mirror subassembly when said mirror subassembly is in an operative position.

* * * * *

UNITED STATES PATENT AND TRADEMARK OFFICE
CERTIFICATE OF CORRECTION

PATENT NO. : 5,432,640
DATED : July 11, 1995
INVENTOR(S) : Robert W. Gilbert et al It is certified that error appears in the above-indentified patent and that said Letters Patent is hereby corrected as shown below:

On the Title Page, under "Attorney, Agent, or Firm", "Harness, Dickey & Pierce" should be --Harness, Dickey & Pierce, P.L.C.--.

Column 2, line 53, after "base" insert --11.--.

Column 2, line 65, after "1" insert --.--.

Column 3, line 17, after "surface" insert --13.--.

Column 4, line 17, Claim 1, "." should be --,--.

Column 4, line 21, Claim 1, "." should be --,--.

Column 4, lines 35-36, Claim 1, after "recess" insert --surfaces--.

Column 4, line 51, Claim 3, after "and" insert --a--.

Column 4, line 65, Claim 3, after "axis" insert --and--.

Column 4, line 66, Claim 3, "radical" should be --radial--.

Column 5, line 19, Claim 4, "plane" should be --planes--.

Column 5, line 30, Claim 6, "5" should be --3--.

Column 5, line 45, Claim 8, "there" should be --three--.

UNITED STATES PATENT AND TRADEMARK OFFICE
CERTIFICATE OF CORRECTION

PATENT NO. : 5,432,640
DATED : July 11, 1995
INVENTOR(S) : Robert W. Gilbert et al It is certified that error appears in the above-indentified patent and that said Letters Patent is hereby corrected as shown below:

Column 6, line 43, Claim 12, after "second" insert --generally radial direction with respect to said axis upon pivotal--.

Column 6, line 48, Claim 13, "or" should be --of--.

Column 6, line 52, Claim 14, (first occurrence), delete "pads".

Signed and Sealed this

Thirty-first Day of October 1995

Attest:

BRUCE LEHMAN

Attesting Officer        Commissioner of Patents and Trademarks